United States Patent
Nakashima

(10) Patent No.: US 10,133,753 B2
(45) Date of Patent: Nov. 20, 2018

(54) DATA PROCESSING METHOD AND DATA PROCESSING APPARATUS

(71) Applicant: CANON KABUSHIKI KAISHA, Tokyo (JP)

(72) Inventor: Daisuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 14/813,572

(22) Filed: Jul. 30, 2015

(65) Prior Publication Data

US 2016/0042062 A1 Feb. 11, 2016

(30) Foreign Application Priority Data

Aug. 7, 2014 (JP) .................................. 2014-161895

(51) Int. Cl.
- *G06F 17/30* (2006.01)
- *G06K 9/62* (2006.01)
- *G06T 7/11* (2017.01)

(52) U.S. Cl.
CPC ..... *G06F 17/30247* (2013.01); *G06K 9/6215* (2013.01); *G06K 9/6221* (2013.01); *G06T 7/11* (2017.01)

(58) Field of Classification Search
CPC .......... G06T 7/11; G06T 7/187; G06K 9/4652
See application file for complete search history.

(56) References Cited

FOREIGN PATENT DOCUMENTS

JP 3611006 B2 1/2005

OTHER PUBLICATIONS

Wu, Tao, and Kun Qin. "Image data field for homogeneous region based segmentation." Computers & Electrical Engineering 38.2 (2012): 459-470.*

Sharma, Gaurav, Wencheng Wu, and Edul N. Dalai. "The CIEDE2000 color-difference formula: Implementation notes, supplementary test data, and mathematical observations." Color Research & Application 30.1 (2005): 21-30.*

Van De Weijer, Joost, and Theo Gevers. "Color constancy based on the grey-edge hypothesis." Image Processing, 2005. ICIP 2005. IEEE International Conference on. vol. 2. IEEE, 2005. (Year: 2005).*

Radhakrishna Achanta, et al., "SLIC Superpixels Compared to State-of-the-Art Superpixel Methods," IEEE Transactions on Pattern Analysis and Machine Intelligence, vol. 34, No. 11, pp. 2274-2282, Nov. 2012.

"Algorithmic Transformations in the Implementation of K-means Clustering on Reconfigurable Hardware", Proceeding of International Symposium on Field Programmable Gate Arrays, pp. 103-110, Jan. 2001.

* cited by examiner

*Primary Examiner* — William Spieler
(74) *Attorney, Agent, or Firm* — Fitzpatrick, Cella, Harper & Scinto

(57) ABSTRACT

In a data processing method of determining a class to which each of a plurality of input data items belongs, a distance between input data and each of a plurality of representative data items is calculated, a distance calculation method is selected based on the input data, and the input data is allocated to a class to which representative data, from which a shortest distance has been obtained out of the calculated distances using the selected distance calculation method, belongs.

16 Claims, 5 Drawing Sheets

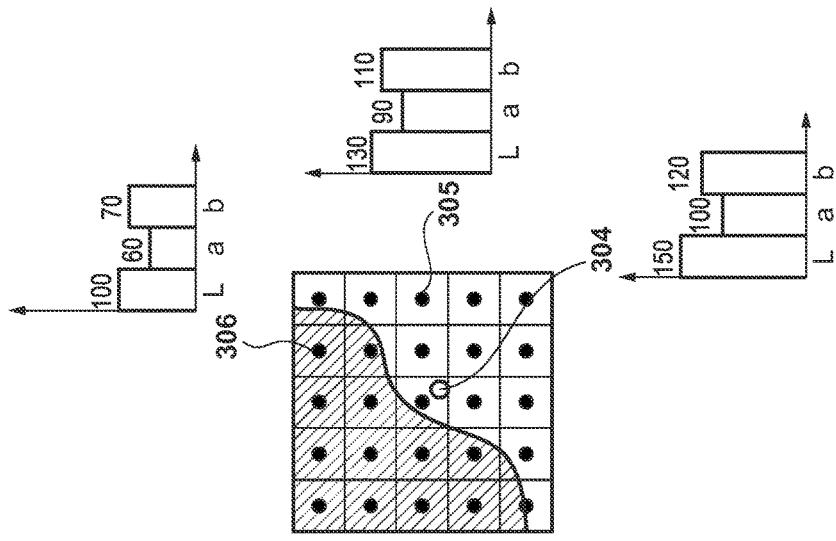
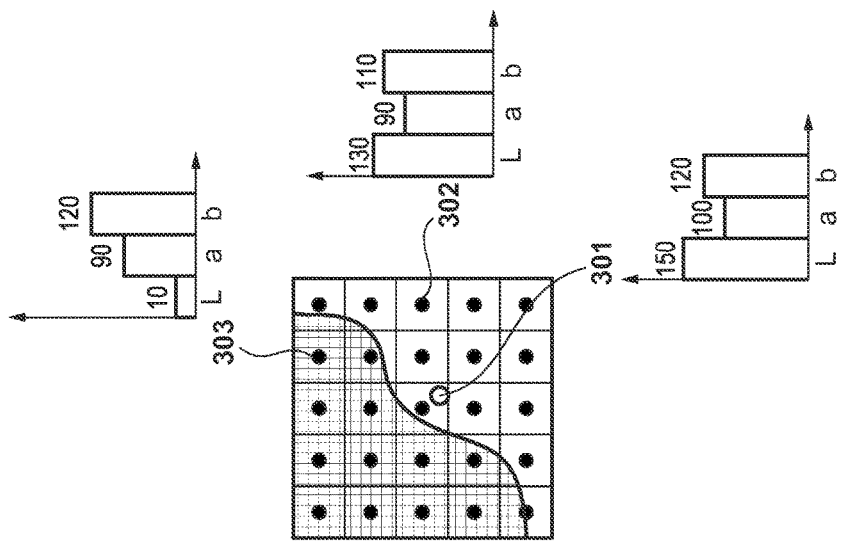

DATA PROCESSING METHOD AND DATA PROCESSING APPARATUS

BACKGROUND OF THE INVENTION

Field of the Invention

The present invention relates to a data processing method and data processing apparatus for dividing input data into a plurality of classes.

Description of the Related Art

Recently, a technique of dividing an image into a plurality of regions similar in an attribute such as color, texture, or coordinates is receiving attention. The divided region is called a superpixel. Since coding processing, image processing, and image recognition processing can be executed for each divided region, this technique is applicable to various image processing apparatuses.

Various methods have conventionally been proposed in regard to region segmentation of an image. In particular, there are proposed many methods of dividing an image into regions by clustering pixels. According to this method, data having a color, texture, and coordinates as elements are clustered based on the distance between elements. In clustering, representative data of each cluster is obtained, and input data is assigned to nearest-neighbor representative data. At this time, distances between the input data and a plurality of representative candidate data items are calculated to search for nearest-neighbor representative data. Related arts of region segmentation using clustering are proposed, for example, by the following literatures.

[patent literature 1] Japanese Patent No. 3611006

[non-patent literature 1] Radhakrishna Achanta, et al., "SLIC Superpixels Compared to State-of-the-Art Superpixel Methods," IEEE Transactions on Pattern Analysis and Machine Intelligence, vol. 34, No. 11, pp. 2274-2282, November 2012

[non-patent literature 2] "Algorithmic Transformations in the Implementation of K-means Clustering on Reconfigurable Hardware", Proceeding of International Symposium on Field Programmable Gate Arrays, pp. 103-110, 2001

Non-patent literature 1 proposes a method of performing region segmentation using a so-called SLIC (Simple Linear Iterative Clustering) clustering method. In SLIC, the search area of nearest-neighbor representative data in K-means clustering is restricted to a local region in an image. Calculation of a distance between input data and representative data of each class normally uses a Euclidian distance (L2 distance), but a method using a distance other than the Euclidian distance is also proposed. For example, non-patent literature 1 proposes a method in which the weighted distance of each element of data is used. Non-patent literature 2 proposes a method in which the linear sum of an L1 distance and an L∞ distance is used as a distance.

As described above, clustering is a technique well used in region segmentation of an image. In region segmentation, it is important that regions different in color and texture characteristics are separated. In clustering, it is therefore preferable that the distance between input data and representative candidate data in a region similar in color and texture characteristic is small and that in contrast, the distance between input data and representative candidate data in a region different in color and texture characteristic is large.

In the method described in non-patent literature 1, the linear sum of a color distance and a coordinate distance is used as a total distance. In non-patent literature 1, both the color distance and coordinate distance are Euclidian distances. However, if the Euclidian distance is used in calculation of the color distance, the color distance may not become so large even between regions different in color characteristic. For example, only a few color components become greatly different between regions, and the discrepancies of many other color components are small. In this case, since the discrepancies of many color components are small and the total color distance does not become large, the boundary accuracy between such regions becomes poor.

The method described in patent literature 1 can set different weights for all elements (color components) in distance calculation, so the boundary accuracy is considered to be improved in some cases, compared to the case in which the Euclidian distance is used. The method described in non-patent literature 2 uses the distance calculation method of the L1 distance and L∞ distance different in characteristic from the Euclidian distance, and the boundary accuracy is thus considered to be improved, compared to the case in which the Euclidian distance is used. However, neither of these methods considers the characteristic of input data, and the coefficient of the weight or linear sum is fixed regardless of input data. This poses a problem that the boundary accuracy becomes poor depending on a processing target image.

SUMMARY OF THE INVENTION

According to one of embodiments of the present invention, a data processing apparatus or a data processing method that enables appropriate clustering in accordance with input data.

According to one aspect of the present invention, there is provided a data processing method of determining a class to which each of a plurality of input data items belongs, comprising: calculating a distance between input data and each of a plurality of representative data items; selecting a distance calculation method based on the input data; and allocating the input data to a class to which representative data, from which a shortest distance has been obtained out of distances calculated in the calculating using the distance calculation method selected in the selecting, belongs.

According to another aspect of the present invention, there is provided a non-transitory computer readable storage medium storing a program for causing a computer to execute a data processing method of determining a class to which each of a plurality of input data items belongs, comprising: calculating a distance between input data and each of a plurality of representative data items; selecting a distance calculation method based on the input data; and allocating the input data to a class to which representative data, from which a shortest distance has been obtained out of distances calculated in the calculating using the distance calculation method selected in the selecting, belongs.

According to another aspect of the present invention, there is provided a data processing apparatus that determines a class to which each of a plurality of input data items belongs, comprising: a calculation unit configured to calculate a distance between input data and each of a plurality of representative data items; a selection unit configured to select a distance calculation method based on the input data; and an allocation unit configured to allocate the input data to a class to which representative data, from which a shortest distance has been obtained out of distances calculated by the calculation unit using the distance calculation method selected by the selection unit, belongs.

Further features of the present invention will become apparent from the following description of exemplary embodiments with reference to the attached drawings.

BRIEF DESCRIPTION OF THE DRAWINGS

FIGS. 3A and 3B are views each showing an example of the color components of input data and representative candidate data;

DESCRIPTION OF THE EMBODIMENTS

Preferred embodiments of the present invention will now be described with reference to the accompanying drawings. Note that an example in which region segmentation of an image is performed using a clustering method according to the present invention will be explained in the embodiments.

First Embodiment

<Example of Arrangement of Data Processing Apparatus>

Figure 4:
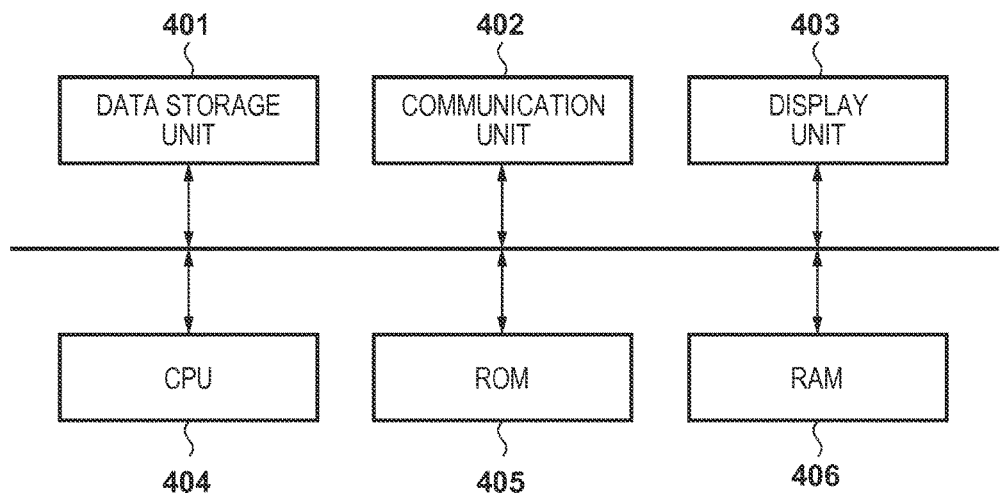
FIG. 4 is a block diagram showing the arrangement of a data processing apparatus.

FIG. 4 is a block diagram showing an example of the arrangement of a data processing apparatus capable of implementing a clustering method according to the first embodiment. An arrangement in which the CPU implements respective processes to be described with reference to the flowchart of FIG. 1 and the like will be explained. However, some processes may be implemented by hardware, as a matter of course.

A data storage unit 401 is constituted by, for example, a hard disk, flexible disk, CD-ROM, CD-R, DVD, memory card, CF card, smart medium, SD card, memory stick, xD picture card, or USB memory. The data storage unit 401 stores an image subjected to clustering (or region segmentation). In addition to an image, the data storage unit 401 can also store a program and other data. Note that part of a RAM 406 to be described later may be used as the data storage unit 401. Alternatively, the data storage unit 401 may be constituted by using, via a communication unit 402 to be described later, the storage of a device connected by the communication unit 402. A display unit 403 is a device that displays images before and after region segmentation processing, or images such as those in a GUI. A CRT, a liquid crystal display, or the like is used in general. Alternatively, an external display device connected by a cable or the like may be used as the display unit 403.

A CPU 404 executes main processing according to this embodiment and also controls the operation of the overall apparatus. A ROM 405 and the RAM 406 provide a program, data, a work area, and the like necessary for this processing to the CPU 404. When a program necessary for processing to be described later is stored in the data storage unit 401 or the ROM 405, the program is temporarily loaded into the RAM 406 and then executed. When the data processing apparatus receives a program from an external storage device via the communication unit 402, the program is temporarily recorded in the data storage unit 401 and then loaded into the RAM 406, or is directly loaded from the communication unit 402 into the RAM 406 and then executed.

The CPU 404 writes, in the RAM 406, a processing target image stored in the data storage unit 401, reads out the image from the RAM 406, and executes clustering processing. Data during processing, such as representative candidate data, is written in the RAM 406 by the CPU 404, and read out as necessary. The clustering processing result is written in the RAM 406, displayed on the display unit 403, or transmitted to an external apparatus via the communication unit 402. Although there is only one CPU (CPU 404) in FIG. 4, it is apparent that a plurality of CPUs may be provided.

The communication unit 402 functions as a communication I/F for performing communication between devices. The communication I/F can use various communication methods including wired communication such as communication over a well-known local area network, USB, IEEE1284, IEEE1394, and a telephone line. Alternatively, the communication I/F may use wireless communication methods such as infrared rays (IrDA), IEEE802.11a, IEEE802.11b, IEEE802.11g, IEEE802.11n, Bluetooth®, and UWB (Ultra Wide Band).

Although one data processing apparatus incorporates all the data storage unit 401 and display unit 403 in FIG. 4, the present invention is not limited to this. That is, these building components may be connected by a communication channel based on a well-known communication method, obtaining such an arrangement as a whole. Note that there are various other building components in the system configuration, but they are not the gist of the present invention, and a description thereof will be omitted. The contents of processing by the data processing apparatus shown in FIG. 4 will be explained. Each step in the flowchart represents an operation of the CPU 404.

<Clustering for Region Segmentation>

Figure 1:
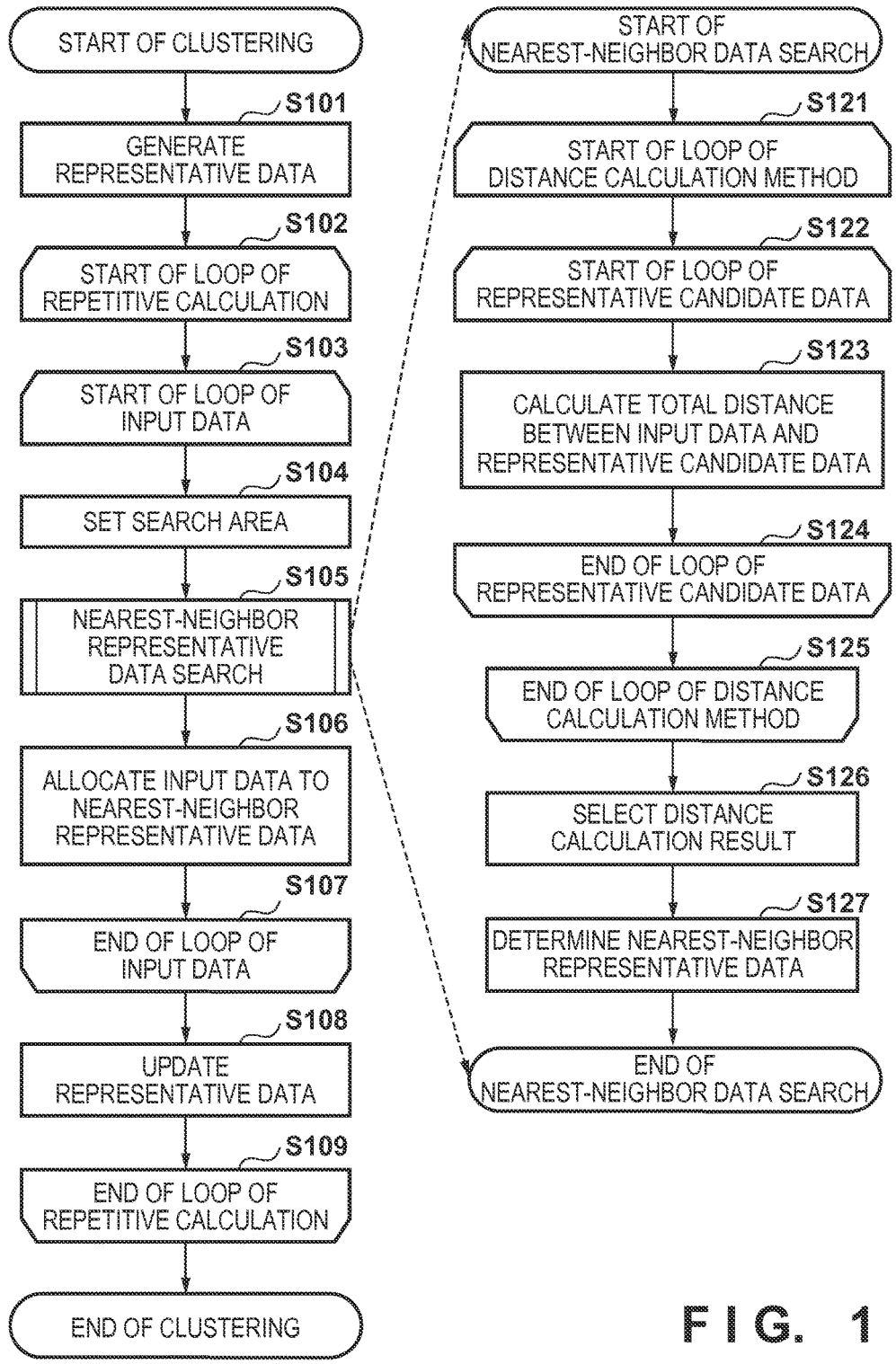
FIG. 1 is a flowchart showing a clustering method according to the first embodiment.

FIG. 1 is a flowchart showing a clustering method according to this embodiment. In the clustering method according to this embodiment, a class to which each of a plurality of input data items included in an input data set belongs is determined based on the distance between each input data item and representative data of each class. In the following description, an image is handled as an input data set, and a pixel constituting the image is handled as input data. First, clustering target data will be explained. Equation (1) represents the ith input data item. The input data is pixel data corresponding to a pixel in the image, and is indicated by five-dimensional vectors:

$$X_i = (x_{i,1}, x_{i,2}, x_{i,3}, x_{i,4}, x_{i,5}) \qquad (1)$$

where $x_{i,1}$ and $x_{i,2}$ are the positions in a two-dimensional coordinate space that mean the coordinate values of an image in the longitudinal and lateral directions, and $x_{i,3}$, $x_{i,4}$, and $x_{i,5}$ are the three-dimensional color features.

Figure 2:
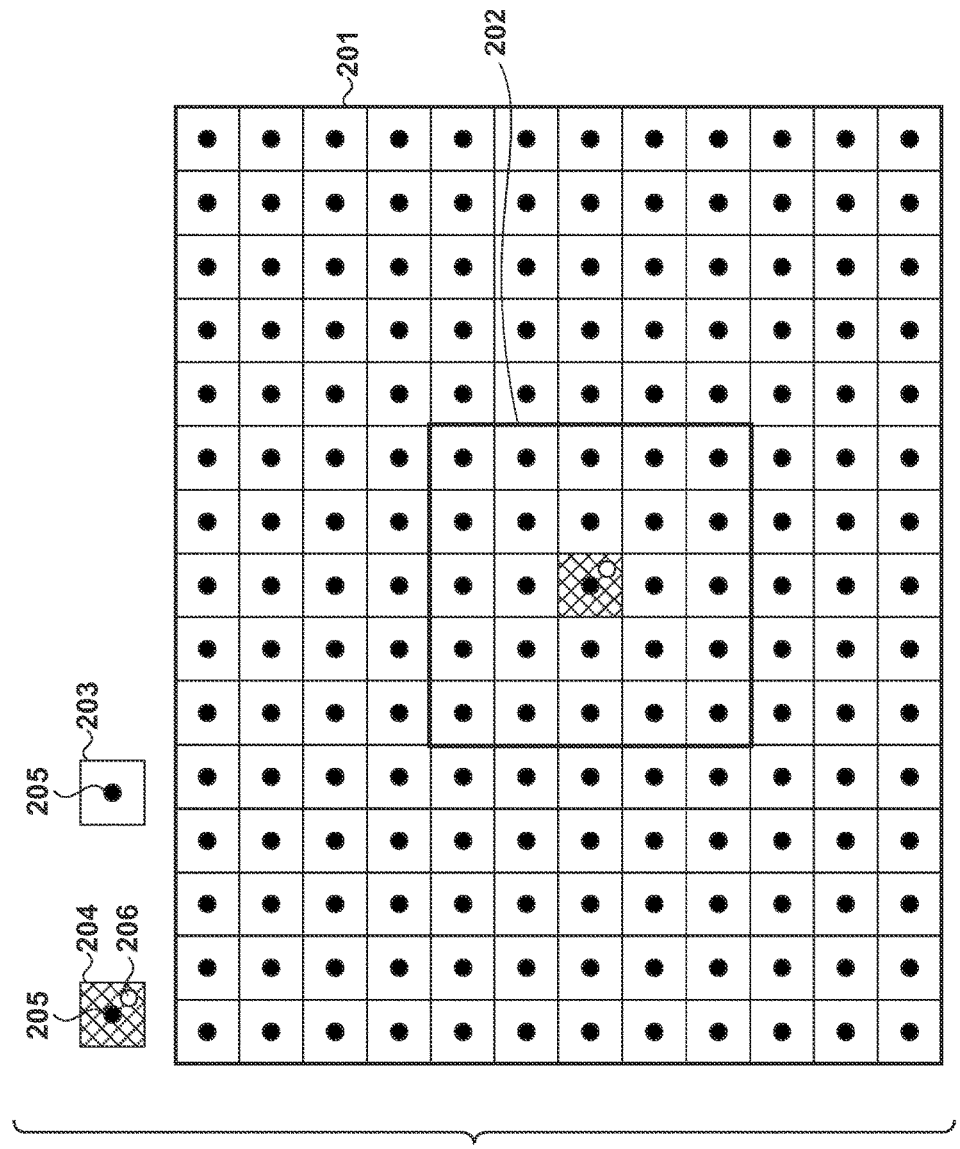
FIG. 2 is a view for explaining the search area of nearest-neighbor representative data.

In step S101, the CPU 404 initializes and generates representative data. More specifically, a clustering processing target image 201 shown in FIG. 2 is divided into blocks in the coordinate space, and one representative item of data 205 is arranged in each block 203. Input data in the blocks 203 are selected at random, and the vectors of the coordinates and color feature of each selected input data item are used as the vectors of representative data representing a class. Equation (2) represents the jth representative data item:

$$C_j=(c_{j,1}, c_{j,2}, c_{j,3}, c_{j,4}, c_{j,5}) \quad (2)$$

where $c_{j,1}$ and $c_{j,2}$ are the positions in a two-dimensional coordinate space that mean the coordinate values of an image in the longitudinal and lateral directions, and $c_{j,3}$, $c_{j,4}$, and $c_{j,5}$ are the three-dimensional color features.

In step S102, the maximum repeat count is set, and a loop of repetitive calculation starts. In step S103, a loop of input data starts. While incrementing an order i of input data item $X_i$ in the image, the CPU 404 clusters all input data by repeating processes in steps S104 to S106. In step S104, the CPU 404 sets a search area. More specifically, the search area (for example, a search area 202 in FIG. 2) of representative candidate data is set based on the coordinate position of input data. Note that the representative candidate data of input data is a candidate of representative data to which the input data is assigned (allocated), and is representative data within a set search area.

This embodiment will explain an example in which the search area 202 is an area of 5×5 blocks 203, that is, the search area 202 has five representative data in each of the directions of width and height. The search area 202 of nearest-neighbor representative data centered on a block 204 including input data 206 of interest is set. In this case, the search area 202 is constituted by 5×5 coordinate-neighbor representative data. In the example shown in FIG. 2, the longitudinal indices of the representative data of the search area 202 range from 5 to 9, and the lateral indices range from 6 to 10. In this embodiment, the search area 202 of all input data falling in the area of the block 204, including the input data 206 of interest, does not change. Note that the relationship between the position of input data and representative candidate data of the search area is fixed first. Even if the position of representative data changes upon updating the representative data by repetitive processing, the index of the representative data does not change.

In step S105, search for nearest-neighbor representative data is performed. The nearest-neighbor representative data of input data is representative data having a shortest distance to the input data, that is, is nearest representative data in the distance space. Details of the search processing in step S105 will be described later with reference to a flowchart on the right side of FIG. 1. In step S106, the CPU 404 allocates the input data to the above-described nearest-neighbor representative data based on the nearest-neighbor representative data search result (step S105). In step S107, the CPU 404 determines whether all input data have been processed. If the CPU 404 determines that all input data has been processed, it ends the input data loop, and the process advances to step S108. If unprocessed input data remains, the process returns to step S104 to start the above-described processes for the next input data item.

In step S108, the CPU 404 calculates the mean vector of the vectors of allocated input data for each representative data item. The CPU 404 sets the mean vector as a new vector Cj of the representative data, and updates the representative data. In step S109, the CPU 404 determines whether an end condition is satisfied. For example, the CPU 404 determines whether the repeat count exceeds the maximum repeat count or whether the clustering result converges. If the end condition is satisfied, the CPU 404 ends the repetitive calculation. If the end condition is not satisfied, the process returns to step S103, and the CPU 404 starts the next repetitive calculation. If the clustering processing ends, the result of the clustering processing is output as the result of region segmentation.

<Nearest-Neighbor Representative Data Search>

The nearest-neighbor representative data search processing to be executed in step S105 will be described with reference to the flowchart on the right side of FIG. 1. In steps S121 to S127, representative candidate data are searched for representative data having a shortest distance for the ith input data item $X_i$. First, in steps S121 to S125, distances between input data and respective representative candidate data are calculated using respective distance calculation methods. In step S126, one of the plurality of distance calculation methods is selected based on the distances calculated using the plurality of distance calculation methods. In this manner, selection of a distance calculation method corresponding to input data is performed. In step S127, nearest-neighbor representative data is determined based on a distance calculated by the selected distance calculation method.

Before a description of processing contents in each step, a method of calculating a distance between input data and representative candidate data according to this embodiment will be explained. Equation (3) is an equation for calculating a distance between the ith input data item and the jth representative candidate data item:

$$D(X_i, C_j) = W \times D_s(X_i, C_j) + D_c(X_i, C_j) \quad (3)$$

The distance between the ith input data item and representative candidate data is an integration of a plurality of partial distances. In this embodiment, a distance in the coordinate space and a distance in the color space are integrated. In equation (3), Ds is the distance (partial distance) in the coordinate space, and Dc is the distance (partial distance) in the color space. W is the weight on the distance in the coordinate space. In this embodiment, as represented by equation (3), the distance between input data and representative candidate data is calculated by linear combination of Ds and Dc. In the following description, a distance calculated from a plurality of partial distances will be called a total distance.

In the clustering method according to this embodiment, a distance calculation method to be used is selected from a plurality of distance calculation methods in accordance with input data. When calculating a total distance from a plurality of partial distances, a distance calculation method is selected for at least one of these partial distances. In this embodiment, one type of Euclidian distance (L2 distance) is used as the distance calculation method of the distance Ds in the coordinate space. Further, two types of Manhattan distance (L1 distance) and Chebyshev distance (L∞ distance) are used as the distance calculation method of the distance Dc in the color space.

Equation (4) is a Ds calculation equation based on the L2 distance, and equations (5) and (6) are Dc calculation equations based on the L1 distance and the L∞ distance, respectively:

$$D_S(X_i, C_j) = \sqrt{(x_{i,1} - c_{j,1})^2 + (x_{i,2} - c_{j,2})^2} \quad (4)$$

$$D_C(X_i, C_j) = H_1 \cdot (|x_{i,3} - c_{j,3}| + |x_{i,4} - c_{j,4}| + |x_{i,5} - c_{j,5}|) \quad (5)$$

$$D_C(X_i, C_j) = H_\infty \cdot \max(|x_{i,3} - c_{j,3}|, |x_{i,4} - c_{j,4}|, |x_{i,5} - c_{j,5}|) \quad (6)$$

where $H_1$ and $H_\infty$ are the coefficients for normalizing the L1 distance and L∞ distance, respectively.

The reason why these distance calculation methods are used will be explained. First, the Euclidian distance (L2 distance) is used as a distance in the coordinate space. This is because it is preferable that the distance in the coordinate space represents a linear distance between a pixel on an image and representative candidate data in region segmentation. As for a distance in the color space, a distance selected from the Manhattan distance (L1 distance) and the Chebyshev distance (L∞ distance) is used. In region segmentation, it is preferable that the color distance between input data and representative candidate data present in a region similar in color characteristic is small and in contrast, the color distance between input data and representative candidate data present in a region different in color characteristic is large. Only a few color components are greatly different between regions different in color characteristic in some cases, and many color components are equally different in other cases.

Equation (7) is a Dc calculation equation based on an Lp distance (p=1, 2, . . . , ∞):

$$D_C(X_i, C_j) = \sqrt[p]{|x_{i,3} - c_{j,3}|^p + |x_{i,4} - c_{j,4}|^p + |x_{i,5} - c_{j,5}|^p} \quad (7)$$

As represented by equation (7), when the p value in the Lp distance is small, the values of the exponents of the respective components are small and the Dc value becomes close to the average value of the differences of the respective components. In contrast, when the p value is large, the influence of a few components each having a large difference, out of the respective components, on the Dc value becomes large.

For this reason,
when only a few color components are greatly different, an Lp distance having a large p value is used, and
when many color components are equally different, an Lp distance having a small p value is used. As a result, the difference between a color distance between input data and representative candidate data in a region similar in color characteristic, and a color distance between the input data and representative candidate data in a region different in color characteristic becomes large. Especially, this embodiment employs distance calculation methods represented by equation (5) and equation (6) for p=1 and p=∞. Note that the Lp distance is normalized because the range of the value of the Lp distance changes depending on the p value. In this embodiment, the Lp distance is normalized so that the maximum values of respective Lp distances become equal. That is, since the maximum value of the L1 distance is 255×3 and the maximum value of the L∞ distance is 255, $H_1=1$ and $H_\infty=3$.

FIGS. 3A and 3B are views each showing an example of the color components (color components represented in the Lab color space) of input data and representative candidate data. An effect of selecting the L1 distance and the L∞ distance as a color distance calculation method will be explained with reference to FIGS. 3A and 3B. FIG. 3A shows an example when only a few color components are greatly different between regions (only the L component is greatly different). FIG. 3B shows an example when all color components are equally different. In FIG. 3A, color distances between input data 301, and representative candidate data 302 in a region similar in color characteristic and representative candidate data 303 different in color characteristic are as follows for the L1 distance and the L∞ distance:

color distance between the input data 301 and the representative candidate data 302
L1 distance: 40 (=|150−130|+|100−90|+|120−110|)
L∞ distance: 20 (=max(|150−130|, |100−90|, |120−110|))
color distance between the input data 301 and the representative candidate data 303
L1 distance: 150 (=|150−10|+|100−90|+|120−120|)
L∞ distance: 140 (=max(|150−10|, |100−90|, |120−120|))

Therefore, the difference of the normalized color distance between the representative candidate data 302 and 303 is 110 for the L1 distance and 120×3=360 for the L∞ distance. That is, when only a few color components are different, the L∞ distance is selected to increase the difference between a color distance from representative candidate data in a region similar in color characteristic and a color distance from representative candidate data in a region different in color characteristic.

To the contrary, in FIG. 3B, color distances between input data 304, and representative candidate data 305 in a region similar in color characteristic and representative candidate data 306 different in color characteristic are as follows for the L1 distance and the L∞ distance:

color distance between the input data 304 and the representative candidate data 305
L1 distance: 40 (=|150−130|+|100−90|+|120−110|)
L∞ distance: 20 (=max(|150−130|, |100−90|, |120−110|))
color distance between the input data 304 and the representative candidate data 306
L1 distance: 140 (=|150−100|+|100−60|+|120−70|)
L∞ distance: 50 (=max(|150−100|, |100−60|, |120−70|))

When these color distances are normalized and compared, as in the case of FIG. 3A, the difference of the color distance between the representative candidate data 305 and 306 is 100 for the L1 distance and 30×3=90 for the L∞ distance. Thus, when all color components are equally different, the L1 distance is selected to increase the difference between a color distance from representative candidate data in a region similar in color characteristic and a color distance from representative candidate data in a region different in color characteristic.

The processing contents in steps S121 to S127 of FIG. 1 will be explained. In step S121, a loop of the distance calculation method starts. The CPU 404 controls an order k of the distance calculation methods and executes steps S122 to S124 by using all distance calculation methods. This embodiment adopts two types of distance calculation methods for calculation of Dc, that is, a case in which equation (5) is used, and a case in which equation (6) is used. Note that equation (4) is used for calculation of Ds in both of these cases.

In step S122, a loop of representative candidate data starts. The CPU 404 controls an order j of representative candidate data Cj, and searches all representative candidate data. In step S123, a distance between input data and each of a plurality of representative data items is calculated. That is, the CPU 404 calculates a total distance between the ith input data item and the jth representative candidate data item by using the kth distance calculation method. In step S124, the CPU 404 determines whether calculation of distances from all representative candidate data has been completed. If it is determined that the distance calculation has been completed for all j representative candidate data items, the process advances to step S125, and the CPU 404 ends the loop of representative candidate data. If it is determined that unprocessed representative data remains, the process returns to step S123, and the CPU 404 calculates a total distance from the next representative candidate data.

In step S125, it is determined whether the processing using all distance calculation methods has been completed. If it is determined that the processing using all distance calculation methods has been completed, the process advances to step S126 to end the loop of the distance calculation method. If it is determined that an unprocessed distance calculation method remains, the process returns to step S122, and the CPU 404 calculates a total distance between input data and representative candidate data by using the next distance calculation method.

In step S126, a distance calculation method to be used in next step S127 is selected. In this embodiment, a distance calculation method is selected by selecting which of distance calculation results calculated using the distance calculation method including equation (5) and the distance calculation method including equation (6) is used for Dc. In other words, which of results obtained using the calculation methods based on equation (5) and equation (6) will be employed as the partial distance Dc is selected. Note that selection of a distance calculation result is not performed for Ds distance because the Ds distance calculation method is one type represented by equation (4). As described above, it is preferable to select, from equations (5) and (6), a distance calculation method that increases the difference between a color distance from representative candidate data in a region similar in color characteristic and a color distance from representative candidate data in a region different in color characteristic. In this embodiment, therefore, a distance calculation result having a large spread of the distribution between representative candidate data is selected from respective distance calculation results.

Equation (8) is a calculation equation for calculating a spread R of the color distance between representative candidate data according to this embodiment:

$$R = \max_{j \in S_i} D_c(X_i, C_j) - \min_{j \in S_i} D_c(X_i, C_j) \tag{8}$$

where $S_i$ is a set of representative candidate data with respect to the ith input data item.

In step S126, the CPU 404 calculates R in equation (8) for a distance calculation result obtained by each distance calculation method, and selects a distance calculation method that has provided a distance calculation result having a maximum spread R. In step S127, the CPU 404 determines, as nearest-neighbor representative data to which input data item $X_i$ should be allocated, representative candidate data having a shortest distance out of distances (distances calculated by equation (3)) calculated by the distance calculation method selected in step S126.

As described above, according to the clustering method of the first embodiment, total distances between input data and representative candidate data are calculated using a plurality of distance calculation methods, and then a distance calculation result having a large spread between representative candidate data is selected. Therefore, the difference between a distance from representative candidate data in a region similar in color characteristic and a distance from representative candidate data different in color characteristic becomes large, improving the boundary accuracy of region segmentation.

In the first embodiment, input data is constituted by coordinates and a feature, and the distance (total distance) between input data and representative data is calculated by integrating two partial distances, that is, a coordinate distance and a feature distance. Here, a plurality of distance calculation equations are applied to a partial distance based on the feature, and the calculation method of a partial distance based on the coordinates is common to the plurality of distance calculation methods. However, the plurality of distance calculation methods are not limited to this. For example, a plurality of calculation methods may be applied to the coordinate distance. Also, the total distance may include still another partial distance to which a plurality of distance calculation equations are applied. It is only necessary that different distance calculation methods are used as a calculation method for at least one of a plurality of partial distances in the distance calculation method of calculating a total distance by integrating a plurality of partial distances. Note that when there are a plurality of partial distances to which a plurality of calculation methods are applicable, a calculation method having a large spread of the distribution (for example, a calculation method that maximizes R) is selected in regard to each partial distance.

Second Embodiment

Figure 5:
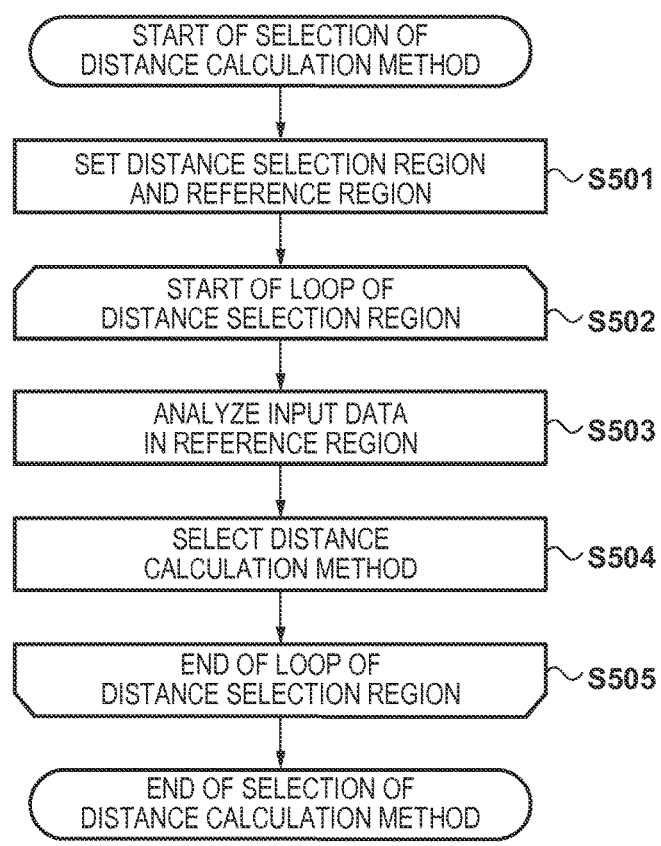
FIG. 5 is a flowchart showing a distance calculation method selection method according to the second embodiment.

In the first embodiment, an appropriate distance calculation method is specified from distance calculation results using a plurality of types of distance calculation methods. In the second embodiment, a distance calculation method to be used is selected based on the statistic of input data (for example, based on the statistic of input data in a predetermined area). Note that the arrangement of a data processing apparatus according to the second embodiment is the same as that according to the first embodiment (FIG. 4). In the overall sequence of clustering processing according to the second embodiment, selection of a distance calculation method is executed prior to processes in step S102 and subsequent steps in the flowchart shown in FIG. 1. FIG. 5 is a flowchart showing a distance calculation method selection method according to the second embodiment. Each step in the flowchart represents an operation of a CPU 404, and is executed before step S101 in the second embodiment.

In step S501, the CPU 404 sets a distance selection region serving as a unit for selecting a distance calculation method, and a reference region to be used to select a distance calculation method in this distance selection region. The same distance calculation method is used for input data in the same distance selection region. In this embodiment, a region including representative candidate data is set as the reference region in order to select a distance calculation method based on the statistic of input data that influences the value of representative candidate data with respect to input data in the distance selection region. In the example shown in FIG. 2, a block 204 is the distance selection region, and a search area 202 (area of 5×5 blocks centered on the distance selection region (block 204)) is the reference region.

In step S502, a loop of the distance selection region starts. The CPU 404 controls an order r of distance selection regions, and selects a distance calculation method for all distance selection regions by repeating steps S503 to S505. In step S503, the CPU 404 analyzes input data in a reference region in the rth distance selection region, and calculates a statistic. More specifically, the degree at which the magnitude of the difference of the color vector between input data in the reference region is localized to a specific component is calculated. Equation (9) is an example of a calculation equation of calculating the statistic in this embodiment:

$$V = \Sigma_{m \in I_r} \Sigma_{n \in I_r} V(X_m, X_n) \tag{9}$$

where $I_r$ is a set of input data included in the rth reference region. $V(X_m, X_n)$ is calculated by:

$$V(X_m, X_n) = \Sigma_{1 \leq u < 3} \Sigma_{u < v \leq 3} ||x_{m,u+2} - x_{n,u+2}| - |x_{m,v+2} - x_{n,v+2}|| \quad (10)$$

where $|x_{m,u} - x_{n,u}|$ is the difference of the uth color component, and $|x_{m,v} - x_{n,v}|$ is the difference of the with color component. By calculating the total discrepancy of the difference of each color component, the $V(X_m, X_n)$ value becomes large when only some color components are greatly different between two input data items, and small when many color components are equally different.

As an example of the case in which many color components are equally different, when $(X_{m,3}, X_{m,4}, X_{m,5}) = (150, 100, 120)$ and $(X_{n,3}, X_{n,4}, X_{n,5}) = (100, 60, 70)$, $V(X_m, X_n) = 20$ $(=||150-100|-|100-60|| + ||150-100|-|120-70|| + ||100-60|-|120-70||)$. As an example of the case in which only some color components are greatly different, when $(X_{m,3}, X_{m,4}, X_{m,5}) = (150, 100, 120)$ and $(X_{n,3}, X_{n,4}, X_{n,5}) = (10, 90, 120)$, $V(X_m, X_n) = 280$ $(=||150-10|-|100-90|| + ||150-10|-|120-120|| + ||100-90|-|120-120||)$.

In step S504, the CPU 404 selects a distance calculation method based on the V value calculated in step S503. If the V value is large, this indicates that only some color components of input data in the reference region are greatly different. In contrast, if the V value is small, many color components of input data in the reference region are equally different. Thus, the L∞ distance is selected in the former case, and the L1 distance is selected in the latter case. In this embodiment, a color distance calculation method is selected based on the result of comparison between the V value and a threshold Th. More specifically, if V≥Th, the CPU 404 selects the L∞ distance, and if V<Th, selects the L1 distance. The selected distance calculation method is stored in a RAM 406 in association with the ordinal number r of the distance selection region. In step S505, the CPU 404 determines whether distance calculation methods have been selected for all distance selection regions. If distance calculation methods have been selected for all distance selection regions, the distance calculation method selection processing ends. If an unprocessed distance selection region remains, the process returns to step S503, and the CPU 404 selects a distance calculation method for the next distance selection region.

Figure 6:
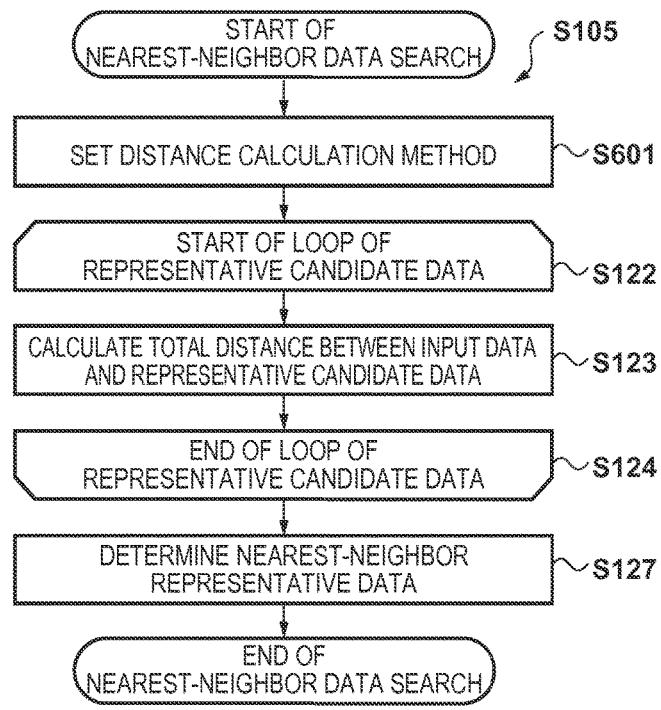
FIG. 6 is a flowchart showing a nearest-neighbor data search method according to the second embodiment.

After selecting a distance calculation method for each distance selection region by the above-described processing, input data are sequentially clustered in steps S101 to S109. However, since a distance calculation method to be used has been selected in the second embodiment, nearest-neighbor representative data search processing in step S105 differs from that in the first embodiment. FIG. 6 is a flowchart showing a nearest-neighbor data search method according to the second embodiment.

In step S601, the CPU 404 sets a distance calculation method to be used for the ith input data item according to a distance calculation method for each distance selection region that has been stored in the RAM 406 in step S504. More specifically, the CPU 404 determines a distance selection region to which input data belongs, based on pieces of coordinate information $x_{i,1}$ and $x_{i,2}$ of the input data, and sets the distance calculation method selected in step S504 for the distance selection region. In steps S122 to S124, the CPU 404 calculates a distance between the ith input data item and representative candidate data, as in the first embodiment, by using the distance calculation method set in step S601. In step S127, the CPU 404 determines, as nearest-neighbor representative data for the ith input data item, representative candidate data having a shortest distance out of calculated distances.

As described above, according to the second embodiment, a distance calculation method to be used for input data in a distance selection region is selected based on the statistic of input data in the reference region. By selecting a distance calculation method in accordance with the characteristic of input data in a predetermined region, the boundary accuracy of region segmentation is improved in comparison with a case in which one distance calculation method is used. Since the distance is calculated after determining the distance calculation method, the calculation amount concerning distance calculation becomes smaller than that in the first embodiment.

Third Embodiment

In the second embodiment, the statistic is calculated using all input data in a predetermined region and a distance calculation method is selected based on the calculated statistic. However, the present invention is not limited to this. It is also possible to calculate a statistic using input data selected from input data in a predetermined region, and select a distance calculation method based on the calculated statistic. For example, a predetermined number of input data items (for example, every other pixel or every other line) may be selected from each distance selection region (block) and used for calculation of the statistic. The third embodiment will explain an example in which a distance calculation method to be used is selected based on representative data (representative candidate data) in a predetermined region.

Figure 7:
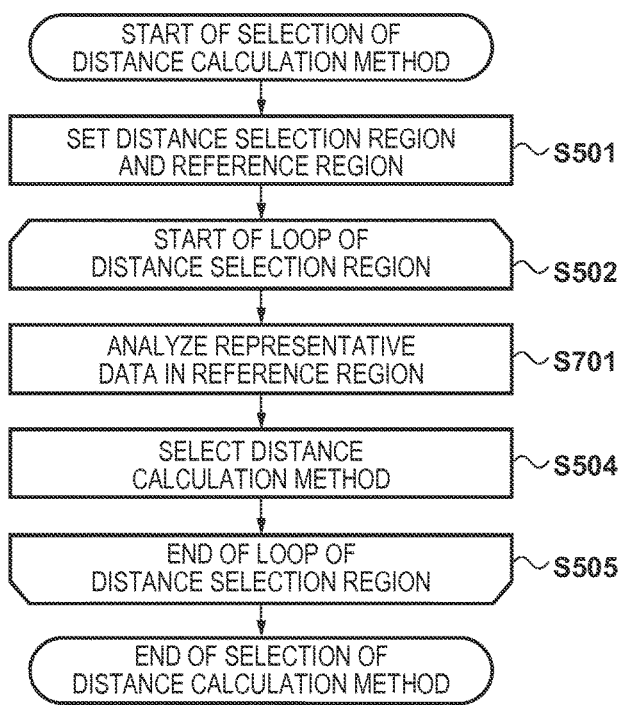
FIG. 7 is a flowchart showing a distance calculation method selection method according to the third embodiment.

FIG. 7 is a flowchart showing a distance calculation method selection method according to the third embodiment. Each step in the flowchart represents an operation of a CPU 404. This processing is executed after setting representative data, that is, between steps S102 and S103 in FIG. 1. That is, at the beginning of each repetitive loop, a distance calculation method is selected using representative data generated in a previous repetitive loop.

Although processing shown in FIG. 7 is the same as that in selection (FIG. 5) of a distance calculation method in the second embodiment, a statistic calculation method in step S701 is different. That is, in step S701, representative data in a reference region with respect to the rth distance selection region is analyzed to calculate a statistic. Equation (11) is an equation for calculating a statistic according to the third embodiment:

$$V = \Sigma_{m \in S_r} \Sigma_{n \in S_r} V(C_m, C_n) \quad (11)$$

where $S_r$ is a set of representative data included in the rth reference region. Note that $V(C_m, C_n)$ is calculated by the same calculation equation as equation (10). The remaining processing is the same as those in the first and second embodiments.

As described above, according to the third embodiment, a distance calculation method to be used for input data in a distance selection region is selected based on the statistic of representative data in the reference region. By using representative data smaller in number than input data, the calculation amount can be reduced in comparison with the second embodiment.

Other Embodiments

In the first embodiment, the spread of the distribution of distance calculation results between representative candidate data is calculated based on the difference between the maximum and minimum values of Dc distance calculation results (equation (8)). However, the present invention is not limited to this. For example, the spread of the distribution may be determined based on the dispersion of distance calculation results. It is also possible to calculate a difference between maximum and minimum values, excluding upper and lower distance calculation results, like a quartile area.

Although a distance calculation result is selected in every loop of repetitive calculation in the first embodiment, the present invention is not limited to this. For example, distance calculation results may be selected in only first L (L≥1) loops for one processing target block (block 204), and a distance calculation method selected in the Lth loop may be used in a loop of repetitive calculation after this block.

Although normalization is performed so that maximum values in different distance calculation methods become equal in the first embodiment, the normalization method is not limited to this. For example, image sets for learning may be prepared, and normalization may be performed to maximize the boundary accuracy for these image sets.

In the second and third embodiments, the degree at which the magnitude of the difference of a color vector between input data (all input data in the second embodiment or representative data in the third embodiment) in the reference region is localized to a specific component is calculated using equations (9) to (11). However, the statistic calculation method is not limited to this. For example, the ratio may be used instead of the difference in equation (10). It is also possible to calculate the dispersion of each component between data in the reference region and use, as a statistic, the difference or ratio of the dispersion of the component.

In the second and third embodiments, the discrepancy of the difference of each component is calculated for all combinations of input data (all input data in the second embodiment or representative data in the third embodiment) in the reference region. However, the present invention is not limited to this. For example, it is also possible to calculate the average of input data in the reference region and calculate the discrepancy of the difference of each component by comparing the average and each data item in the reference region. It is also possible to select one or a plurality of input data items or representative data in the reference region, and calculate the discrepancy of the difference of each component by comparing the selected data and each input data item in the reference region.

The distance selection region and the reference region are different regions in the second and third embodiments, but may be the same region.

In the first to third embodiments, a distance calculation method to be used is selected from the L1 distance and the L∞ distance. However, the present invention is not limited to this, and it may be allowed to select another Lp (p=1, 2, ..., ∞) distance. In addition, the number of Lp distances to be used is not limited to two and is arbitrary. When calculating the Lp distance, a coefficient Hp for normalization is multiplied, as in equations (5) and (6). For example, the value of the coefficient Hp is set so that the maximum values of all Lp distances to be used become equal.

An example in which Q types (Q≥2) of Lp distances are used will be explained. In the first embodiment, a distance calculation method that maximizes the R value calculated by equation (8) is selected from the Q types of Lp distances (step S126). In the second and third embodiments, as the V value calculated by equation (9) or (10) is larger, an Lp distance having a larger p value is selected by using (Q−1) thresholds Thq (q=1, 2, ..., Q−1).

In the first to third embodiments, the Lp distance is normalized so that maximum values become equal. However, the present invention is not limited to this, and the Lp distance may be normalized so that the maximum values of respective Lp distances calculated in a previous repetitive loop become equal.

Although the Lp distance is used in the first to third embodiments, another distance calculation method may be used. Equation (12) is a calculation equation for calculating a color distance between the ith input data item and the jth representative candidate data item by multiplying the differences of respective components by weight coefficients and adding the products:

$$D_C(X_i, C_j) = a_3 \cdot x_{i,3} - c_{j,3} | + a_4 \cdot x_{i,4} - c_{j,4} | + a_5 \cdot |x_{i,5} - c_{j,5}| \tag{12}$$

where $a_3$, $a_4$, and $a_5$ are the weight coefficients for respective components.

Sets each of a plurality of weight coefficients $a_3$, $a_4$, and $a_5$ are prepared as candidates of the distance calculation method, and selected according to the selection method explained in each of the first to third embodiments, thereby selecting a distance calculation equation corresponding to input data. Note that weight coefficients that equalize the maximum values of distances in the case of using respective weight sets are used, as in the case of using the Lp distance.

In the first to third embodiments, the coordinates of input data are two-dimensional coordinates $X_{i,1}$ and $X_{i,2}$. However, the present invention is not limited to this, and coordinates of an arbitrary number of dimensions may be used. For example, three-dimensional image data may be used.

In the first to third embodiments, the feature of input data is represented by three-dimensional color features $X_{i,3}$, $X_{i,4}$, and $X_{i,5}$. However, the present invention is not limited to this. For example, a texture feature may be used as the feature, or a combined feature of a texture feature and color feature may be used. Hence, the number of dimensions of the feature is not limited to three and may be arbitrary. The first to third embodiments have explained an example in which each of the width and height of the search area 202 is defined by five representative data items. However, the width of the search area is not limited to five representative data items, and an arbitrary search area may be used.

According to the above-described embodiments, the boundary accuracy of region segmentation can be improved by changing, in accordance with the characteristic of input data, a method of calculating a distance from representative candidate data.

As described above, according to the embodiments, high-accuracy clustering corresponding to input data becomes possible by changing, in accordance with the characteristic of input data, a method of calculating a distance from representative candidate data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-161895, filed Aug. 7, 2014, which is hereby incorporated by reference herein in its entirety.

What is claimed is:

1. An image processing method of determining a class to which each of a plurality of pixels in an input image belongs, the method comprising:
    selecting a plurality of pixels from the input image as a plurality of representative data items of the input image;
    setting a search range for each pixel in the input image based on a position of that pixel;
    calculating a distance between each pixel in the input image and each of the plurality of representative data items in the search range set for that pixel, using a L1 distance and a L∞ distance, respectively;
    selecting a result of calculating the distance for each pixel in the input image from a result using the L1 distance and a result using the L∞ distance based on localization of magnitudes of differences in components of color vectors between input data; and
    allocating each pixel in the input image to a class to which a representative data item, from which a shortest distance has been obtained out of results selected in the selecting of the result of calculating, belongs.

2. The method according to claim 1, wherein in the selecting, the result is selected based on distances between each pixel and each of the plurality of representative data items that have been calculated using the L1 distance and the L∞ distance.

3. The method according to claim 2, wherein in the calculating, distances obtained using the L1 distance and the L∞ distance are normalized, and
    wherein in the selecting, the result is selected based on normalized distances.

4. The method according to claim 2, wherein in the selecting, the result is selected based on a spread of a distribution of distances between each pixel and each of the plurality of representative data items that have been calculated by the L1 distance and the L∞ distance.

5. The method according to claim 4, wherein in the selecting, a difference between a maximum value and minimum value of a plurality of distances calculated for the plurality of representative data items is used as the spread of the distribution.

6. The method according to claim 4, wherein in the selecting, a dispersion of a plurality of distances calculated for the plurality of representative data items is used as the spread of the distribution.

7. The method according to claim 1, wherein in the calculating, the distance between each pixel and each of the plurality of representative data items is calculated by integrating a plurality of partial distances, and
    wherein the plurality L1 distance and the L∞ distance are different in a calculation method regarding at least one of the plurality of partial distances.

8. The method according to claim 7, wherein each of the plurality of pixels includes a coordinate and a feature,
    wherein in the calculating, the distance between each pixel and each of the plurality of representative data items is calculated by integrating a distance of the coordinate and a distance of the feature, and
    wherein the L1 distance and the L∞ distance are different in a calculation method of the distance of the feature, and are common in a calculation method of the distance of the coordinate.

9. The method according to claim 1, further comprising analyzing a pixel of the plurality of pixels in a predetermined region,
    wherein in the selecting, the result to be used is selected based on a result of the analysis in the analyzing, and
    wherein in the calculating, the distance is calculated using the distance calculation method selected in the selecting.

10. The method according to claim 9, wherein the predetermined region is a region of a predetermined size, and
    wherein in the analyzing, analysis is performed at all or specific positions in the predetermined region.

11. The method according to claim 9, wherein the representative data item is a pixel selected from the predetermined region, and
    wherein in the analyzing, analysis is performed on the representative data item.

12. The method according to claim 9, wherein in the analyzing, a statistic of a pixel in the predetermined region is calculated.

13. The method according to claim 12, wherein each pixel is constituted by a plurality of components, and the statistic is a discrepancy of a difference of each component between pixels in the region.

14. The method according to claim 12, wherein each pixel is constituted by a plurality of components, and the statistic is a discrepancy of a dispersion of each component between pixels in the region.

15. A non-transitory computer-readable storage medium storing a program for causing a computer to execute a data processing method of determining a class to which each of a plurality of pixels in an input image belongs, the method comprising:
    selecting a plurality of pixels from the input image as a plurality of representative data items of the input image;
    setting a search range for each pixel in the input image based on a position of that pixel;
    calculating a distance between each pixel in the input image and each of the plurality of representative data items in the search range set for that pixel, using a L1 distance and a L∞ distance, respectively;
    selecting a result of calculating the distance for each pixel in the input image from a result using the L1 distance and a result using the L∞ distance based on localization of magnitudes of differences in components of color vectors between input data; and allocating each pixel in the input image to a class to which a representative data item, from which a shortest distance has been obtained out of results selected in the selecting of the result of calculating, belongs.

16. An image processing apparatus that determines a class to which each of a plurality of pixels in an input image belongs, the apparatus comprising:

a selecting unit configured to select a plurality of pixels from the input image as a plurality of representative data items of the input image;

a setting unit configured to set a search range for each pixel in the input image based on a position of that pixel;

a calculation unit configured to calculate a distance between each pixel in the input image and each of the plurality of representative data items in the search range set for that pixel, using a L1 distance and a L∞ distance, respectively;

a selection unit configured to select a result of calculating the distance for each pixel in the input image from a result using the L1 distance and a result using the L∞ distance based on localization of magnitudes of differences in components of color vectors between input data; and an allocation unit configured to allocate each pixel in the input image to a class to which a representative data item, from which a shortest distance has been obtained out of results selected by said selection unit in the selection of the result of calculating, belongs.

* * * * *